June 9, 1953  C. V. LUNDEEN  2,641,365
SPRAY GUN STRAINER
Filed July 17, 1947
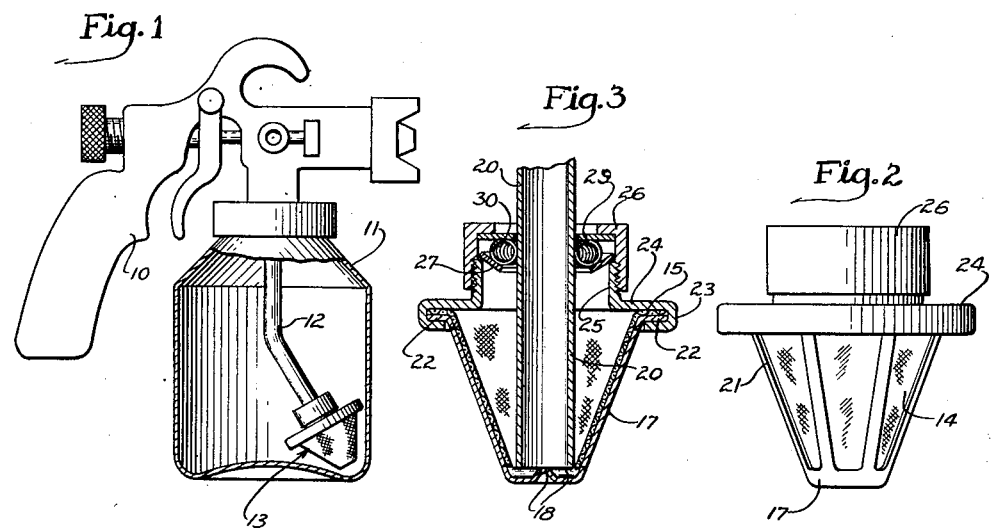
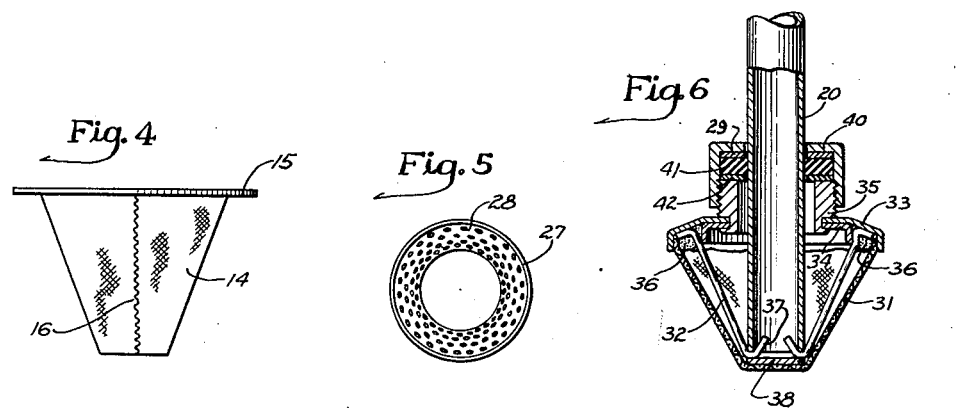
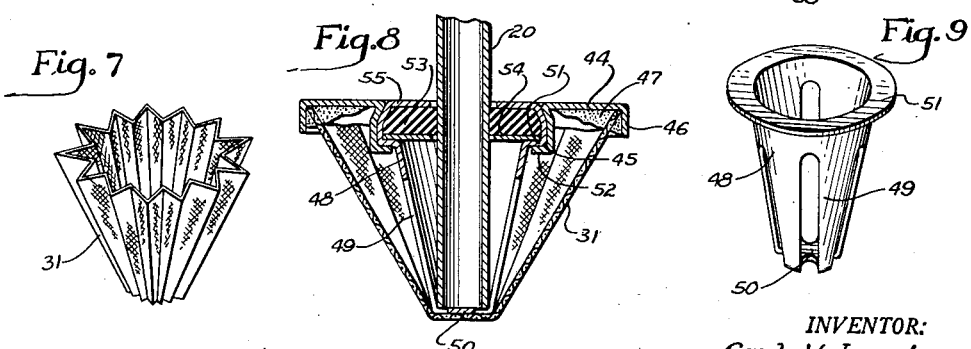
INVENTOR:
Carl V. Lundeen
BY Keith W. Worrell
atty.

Patented June 9, 1953

2,641,365

UNITED STATES PATENT OFFICE 2,641,365

SPRAY GUN STRAINER

Carl V. Lundeen, Hollywood, Ill.

Application July 17, 1947, Serial No. 761,606

6 Claims. (Cl. 210—170)

It is the customary practice to strain paint and lacquers to be used in cup-type spray guns, to avoid spraying objectionable dirt and specks on to a surface. While the time required to do this straining is normally less than ten minutes, when there are frequent paint changes and refills, as experienced by automobile refinishers, for example, the time taken for this operation over any period of time is considerable.

This invention relates to an attachment for a cup-type spray gun which will strain the material as it is being sprayed, thus saving straining effort and the time involved. It is more particularly described as a spray gun strainer for paint and lacquers although it may have a more general use and application for other materials and other uses.

An important object of the invention is to make the strainer adaptable to various spray guns; to arrange it for easily attaching and removing it; to provide for easy cleaning; and to avoid undue contamination when introduced into a succeeding paint change.

A further object of the invention is to improve the quality of finishing by insuring through the use of the strainer that lumps and dirt will not enter the spray gun proper.

A still further object of the invention is to have the strainer adaptable for use with heavy materials known as "surfaces," not normally strained, but by use of the strainer, sanding will be avoided as unnecessary.

Other objects of the invention will appear in the specification and will be apparent from the accompanying drawings, in which, Fig. 1 is a side elevation illustrating a sprayer gun and a cup to which it is attached with a strainer, in accordance with this invention, in the cup;

Fig. 2 is a side elevation of a strainer assembly in accordance with this invention;

Fig. 3 is a sectional view of the strainer shown in Fig. 2, applied to the end of a suction pipe;

Fig. 4 is a side elevation of a strainer screen;

Fig. 5 is a top view of a perforated disc disposed in the strainer;

Fig. 6 is a sectional view of a modification strainer assembly applied at the end of a suction pipe; Fig. 7 is a perspective view of a fluted strainer element; Fig. 8 is a sectional view of a modification of the strainer assembly utilizing a strainer element as shown in Fig. 7; and Fig. 9 is a perspective view of a distending cup as shown in the assembly of Fig. 8.

A metal screen of relatively fine mesh is contemplated for the strainer, but other means, such as perforated metal, cloth or porous material may be used in the strainer. In using the present invention, paint or lacquer may be poured directly into a spray cup for use with the strainer, or the prescribed amount of thinner may be added to obtain a recommended paint consistency.

Referring now more particularly to the drawings, a spray gun 10 is applied in any suitable manner to a paint cup 11 and has a bent suction tube 12 which extends to one side of the center of the cup so that a strainer assembly 13 positioned on the end of the pipe will be located adjacent the edge of the cup opposite the handle of the gun so that when the gun is inclined, the cup may be equally drained of the paint or other material through the strainer assembly.

In the form shown by Figs. 2 to 5, a conical type of strainer 14 made of a fine mesh screen is formed with a flange 15 at its larger end, the smaller end is closed and the screen is formed from sheet material by a soldered or folded joint 16.

Surrounding the screen is a cage 17 having inward cross ribs 18 at the bottom for seating the end of a suction pipe 20 thereon, the smaller end of the screen being closed and extending over the end of the pipe between it and the ribs 18. The sides of the cage are formed with ribs 21 providing a large space therebetween for exposing the screen 14 for screening purposes. The upper end of the cage is also formed with a flange 22 which corresponds to the flange 15 of the screen element and these two flanges are placed together and clamped within an inwardly turned rim 23 of an outwardly extending flange 24, of a tubular member 25. This tubular member is connected to a ring 26 by threading them together and the upper end of the tubular member 25 forms a shoulder for seating a washer 27 therein which is inclined or dished inwardly and formed with a large number of small perforations 28 to avoid trapping a liquid within the strainer.

The upper end of the ring 26 is fitted with a washer 29 which fits the pipe 20 with slight clearance, so that in order to hold and center the strainer element upon the pipe, a coil spring 30 is seated upon the dished portion of the washer 27 and may be compressed against the pipe by turning the ring 26 downwardly against the spring.

In the form shown by Figs. 6 and 7, a fluted screen element 31 has distending wires 32 within it at intervals around the screen inclined to conform somewhat to the inner surfaces of the flutes and secured together around the larger end by a flanged and dished plate 33 and an inner clamping ring 34 clamping together at their inner peripheries by an outwardly threaded body member 35. Between the larger ends of the screen and supporting wires may be a ring of solder, cement 36 to anchor these portions of the screen and wires within the plate 33. At the lower ends of the wires are bent extremities 37 adapted to extend upwardly within the open end of pipe 20 and to engage the upper side of a spacing disc 38 which is disposed between the lower bent ends of the wires and the lower closed end of the screen element 31.

For seating the upper end of the screening assembly upon the pipe, a cup 40 is threaded upon the outside of the body member 35, and a flexible gasket 41 may be compressed therein against the pipe 20 by means of a washer 42, engaging the upper end of the body member.

In the form shown by Figs. 8 and 9, the fluted screen 31 is held at its larger end in a ring 44 having an inner flange 45 and an outer flange 46, by means of solder or cement 47. The smaller end of the screen is distended by a cup 48 of metal or other suitable material having longitudinal cuts 49 in the sides extending partially into a bottom 50. At the larger end of this cup is a flange 51 adapted to be seated within the flange 45 of the ring 44. The flange 45 has an inwardly turned portion 52 upon which the flange 51 is seated and it is held thereon by means of a gasket 53 of resilient member confined between the washer 54 at the bottom and a gasket retainer 55 at the top.

With this construction, the bottom of the cup engages the corresponding portion of the screen and the side openings 49 extending into the bottom, provide inlets for the end of the pipe 30 from the interior of the screen assembly.

In all of these forms, the screen units are somewhat conical or frusto-conical in shape, thereby providing a large amount of screening area at the outside of and closely adjacent to the end of the pipe, the unit embracing somewhat less than a right angle so that it will fit freely within the large angled bottom and sides of a container such as the cup 11 so that it will extend close to the angular corner at the bottom of the cup for removing nearly all of the liquid from the cup.

By making the strainer element in a fluted design, a flat piece of screening may be folded and formed in the desired shape without appreciably distorting the mesh, and at the same time strengthening the strainer element and providing a large straining area. By suitably adjusting the flexible clamping means which engages the pipe 20, these strainer assemblies may be quickly attached to and removed from the end of the pipe for cleaning or replacing the strainer assemblies.

While this invention has been described in some detail as embodied in several different forms, they should be regarded as illustrations or examples rather than limitations or restrictions of the invention, since various changes in the construction, combinations and arrangement of parts may be made without departing from the spirit and scope of the invention.

I claim:

1. The combination with a spray gun having a suction pipe and a receptacle upon which the spray gun is mounted at the top of the receptacle with the pipe thereof extending through the top to remove liquid from the bottom of the receptacle, and a suction strainer assembly for engaging only the bottom of the pipe within the receptacle and comprising a hollow screen element converging at one end, a holder for engaging the larger end of the screen element, the end of the suction pipe being inserted through the holder to the other end of the screen, means in connection with the holder for projecting the other end of the screen element in distended position and around the adjacent end of the pipe, and resilient means in the holder for yieldingly gripping the pipe to hold the bottom of the screen at the bottom of the receptacle.

2. The combination with a spray gun having a suction pipe extending therefrom, of a receptacle having an open top to which the spray gun is removably secured with the pipe extending into the receptacle adjacent the bottom thereof and to remove liquid from the bottom of the receptacle, and a suction strainer assembly comprising a hollow screen element to fit loosely over the end of the suction pipe and flaring outwardly therefrom, a perforated holder for engaging the outwardly flaring end of the screen element, the end of the suction pipe being inserted through the holder and to the reduced end of the screen, means for closing the enlarged end of the screen element around the pipe at a distance from the end thereof, the suction pipe being inserted through the perforation of the holder and to the reduced end of the screen to hold it at the bottom of the receptacle, and a resilient gripper in the holder surrounding the pipe at a distance from the end thereof for yieldingly engaging the outside of the pipe inserted through the holder.

3. The combination with a spray gun having a suction pipe of substantially uniform diameter projecting therefrom, of a receptacle having an open top to which the spray gun is removably secured with the pipe extending near the bottom of the receptacle, and a suction strainer assembly to engage the inner end of the pipe and comprising a hollow screen element closed at one end to fit loosely over the end of the pipe, a holder for the open end of the screen surrounding the pipe at a distance from the end thereof, the holder having an opening through which the end of the pipe is inserted, a resilient pipe gripper in the holder adapted to yieldingly engage a pipe around the circumference thereof for retaining the strainer in place, and means extending from the holder to the other end of the screen adapted to be engaged by the end of a pipe inserted through the holder and into the screen projecting the screen to the bottom of the receptacle.

4. The combination with a spray gun having a suction pipe of substantially uniform diameter projecting therefrom, of a receptacle having an open top to which the spray gun is removably secured with the pipe extending near the bottom of the receptacle, and a suction strainer assembly to engage the inner end of the pipe and comprising a hollow fluted screen element closed at one end, a holder for engaging the other end of the screen element, the holder having an opening through which the suction pipe is inserted to the closed end of the screen element, means mounted in the holder for yieldingly gripping the outer circumference of the suction pipe inserted through the holder and at a distance from the end of the pipe, and means supported by and extending from the holder to engage the closed end of the screen element and to hold the screen element in distended position and the bottom thereof at the bottom of the receptacle when the suction pipe is inserted through the holder.

5. The combination with a spray gun having a suction pipe of substantially uniform diameter projecting therefrom, of a receptacle having an open top to which the spray gun is removably secured with the pipe extending near the bottom of the receptacle, and a suction strainer assembly to engage the inner end of the pipe and comprising a perforated holder adapted to fit loosely around the pipe, resilient means within the holder and adapting the outer surface of the pipe at a distance from the end thereof, a hollow flaring screen element closed at one end and fitting over the end of the pipe inserted through the holder, the other end of the screen element flaring outwardly, means supported from the holder for closing the flaring end of the screen element, and means supported from the holder projecting toward the closed end of the screen for spacing the end of the inserted pipe from the adjacent closed end of the screen element and the closed end of the screen at the bottom of the receptacle so that liquid entering the screen at any portion thereof is also free to enter the end of the pipe inserted in the screen.

6. The combination with a spray gun having a suction pipe of substantially uniform diameter projecting therefrom, of a receptacle having an open top to which the spray gun is removably secured with the pipe extending near the bottom of the receptacle, and a suction strainer assembly to engage the inner end of the pipe and comprising a hollow screen closed at one end to fit loosely over the pipe, a holder engaging and closing the other end of the screen but having a central perforation through which the pipe is inserted into the inner closed end of the screen, a ribbed distending structure supported by a holder engaging the screen and adapted to extend over the closed end but leaving the sides of the screen unobstructed for the admission of liquid therethrough, the ribbed structure having projections at the end adapted to be engaged by the end of the pipe inserted in the screen for projecting the screen to the bottom of a receptacle, the projection allowing free flow of liquid admitted through the screen into the end of the pipe inserted therein, and resilient means in the holder surrounding the pipe at a distance from the end and engaging the outer periphery of the pipe and adapted to hold the closed end of the strainer assembly yieldingly in place at the bottom of the receptacle with the end of the pipe in the closed end of the screen.

CARL V. LUNDEEN.

References Cited in the file of this patent

UNITED STATES PATENTS

| Number | Name | Date |
|---|---|---|
| 711,535 | School | Oct. 21, 1902 |
| 730,356 | Emond | June 9, 1903 |
| 751,918 | Jagger | Feb. 9, 1904 |
| 796,910 | Hernan | Aug. 8, 1905 |
| 1,048,828 | Haas | Dec. 31, 1912 |
| 1,061,755 | Kneuper | May 13, 1913 |
| 1,225,993 | Mullaney | May 15, 1917 |
| 1,394,011 | Hills | Oct. 18, 1921 |
| 1,836,269 | McKenzie | Dec. 15, 1931 |
| 2,019,094 | Rice et al. | Oct. 29, 1935 |
| 2,149,680 | Jewell | Mar. 7, 1939 |
| 2,464,496 | Gee | Mar. 15, 1949 |
| 2,468,862 | Briggs | May 3, 1949 |
| 2,470,943 | Page | May 24, 1949 |
| 2,529,827 | Yarnell | Nov. 14, 1950 |

FOREIGN PATENTS

| Number | Country | Date |
|---|---|---|
| 598,842 | France | Oct. 6, 1925 |
| 814,247 | France | Mar. 15, 1937 |